(12) United States Patent
Collins et al.

(10) Patent No.: US 10,371,214 B2
(45) Date of Patent: Aug. 6, 2019

(54) FLEXIBLE JOINT CONNECTION

(71) Applicant: GE Oil & Gas ESP, Inc., Oklahoma City, OK (US)

(72) Inventors: Charles Collins, Oklahoma City, OK (US); Aaron Noakes, Norman, OK (US)

(73) Assignee: GE Oil & GAs ESP, Inc., Oklahoma City, OK (US)

(*) Notice: Subject to any disclaimer, the term of this patent is extended or adjusted under 35 U.S.C. 154(b) by 148 days.

(21) Appl. No.: 15/397,541

(22) Filed: Jan. 3, 2017

(65) Prior Publication Data

US 2017/0114836 A1    Apr. 27, 2017

Related U.S. Application Data

(63) Continuation of application No. 14/472,649, filed on Aug. 29, 2014, now abandoned, which is a continuation-in-part of application No. 13/727,300, filed on Dec. 26, 2012, now Pat. No. 9,260,924.

(51) Int. Cl.
| | |
|---|---|
| *E21B 23/00* | (2006.01) |
| *F16D 3/18* | (2006.01) |
| *E21B 17/02* | (2006.01) |
| *F16D 3/16* | (2006.01) |
| *E21B 43/12* | (2006.01) |
| *F04C 13/00* | (2006.01) |
| *F04C 15/00* | (2006.01) |
| *F04B 47/02* | (2006.01) |
| *E21B 17/04* | (2006.01) |
| *F16D 3/84* | (2006.01) |
| *F04C 2/107* | (2006.01) |

(52) U.S. Cl.
CPC .............. *F16D 3/185* (2013.01); *E21B 17/02* (2013.01); *E21B 17/04* (2013.01); *E21B 43/128* (2013.01); *F04B 47/02* (2013.01); *F04C 13/008* (2013.01); *F04C 15/0061* (2013.01); *F16D 3/16* (2013.01); *F16D 3/845* (2013.01); *E21B 43/121* (2013.01); *F04C 2/1071* (2013.01)

(58) Field of Classification Search
CPC . F16D 3/185; F16D 3/845; F16D 3/16; E21B 17/04; E21B 43/128; E21B 17/02; E21B 43/121; F04B 47/02; F04C 15/0061; F04C 13/008; F04C 2/1071
USPC ................................. 464/79, 154, 156, 174
See application file for complete search history.

(56) References Cited

U.S. PATENT DOCUMENTS

| | | | | |
|---|---|---|---|---|
| 670,748 | A | * | 3/1901 | Weddeler .................. 464/174 X |
| 1,397,413 | A | * | 11/1921 | Evans ..................... F16D 3/845 |
| | | | | 464/174 |
| 2,491,820 | A | * | 12/1949 | Leibing ..................... F16C 1/04 |
| | | | | 464/174 X |
| 2,870,617 | A | * | 1/1959 | Peters ..................... F16D 3/845 |

(Continued)

*Primary Examiner* — Greg Binda
(74) *Attorney, Agent, or Firm* — Crowe & Dunlevy, P.C.

(57) ABSTRACT

An adapter is used to connect a first component within a downhole pumping system to a second component within the downhole pumping system. The adapter includes an upstream section adjacent the first component and a downstream section adjacent the second component. The adapter further includes an articulating joint that permits the angular movement of the first component with respect to the second component. The articulating joint includes a flexible metal casing extending between the upstream section and the downstream section.

14 Claims, 15 Drawing Sheets

(56) References Cited

U.S. PATENT DOCUMENTS

| | | | | |
|---|---|---|---|---|
| 3,155,070 A * | 11/1964 | Jebens | ................ | B63H 21/305 |
| | | | | 464/154 X |
| 3,605,439 A * | 9/1971 | Filepp | .................... | F16D 3/185 |
| | | | | 464/156 |
| 4,164,855 A * | 8/1979 | Calistrat | .................. | F16C 1/04 |
| | | | | 464/154 |
| 5,209,294 A * | 5/1993 | Weber | .................. | E21B 43/121 |
| 9,976,602 B2 * | 5/2018 | Parmeter | .............. | E21B 43/128 |

\* cited by examiner

FLEXIBLE JOINT CONNECTION

RELATED APPLICATIONS

This application is a continuation of U.S. patent application Ser. No. 14/472,649 filed Aug. 29, 2014, entitled "Flexible Joint Connection," now abandoned which in turn is a continuation-in-part of U.S. patent application Ser. No. 13/727,300, filed Dec. 26, 2012 entitled "Flexible Joint Connection," now U.S. Pat. No. 9,260,924, the disclosures of which are herein incorporated by reference.

FIELD OF THE INVENTION

This invention relates generally to the field of electrical submersible pumping systems, and more particularly, but not by way of limitation, to adapters for connecting components within the pumping system.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Prior art motors often include a fixed stator assembly that surrounds a rotor assembly. The rotor assembly rotates within the stator assembly in response to the sequential application of electric current through different portions of the stator assembly. The motor transfers power to the pump assembly through a common shaft keyed to the rotor. For certain applications, intermediate gearboxes can be used to increase the torque provided by the motor to the pump assembly.

Pump assemblies often employ axially and centrifugally oriented multi-stage turbomachines. Most downhole turbomachines include one or more impeller and diffuser combinations, commonly referred to as "stages." In many designs, each impeller rotates within adjacent stationary diffusers. During use, the rotating impeller imparts kinetic energy to the fluid. A portion of the kinetic energy is converted to pressure as the fluid passes through the downstream diffuser. The impellers are typically keyed to the shaft and rotate in unison.

Often, it is desirable to deploy the pumping system in an offset, deviated, directional, horizontal or other non-vertical well. In these applications, the length and rigidity of the pumping system must be considered as the system is deployed and retracted through curved or angled portions of the well. As the incidence of non-vertical wellbores increases, there is need for a pumping system that can navigate these non-vertical deployments. It is to this and other deficiencies in the prior art that the present invention is directed.

SUMMARY OF THE INVENTION

In certain embodiments, the present invention includes an adapter used to connect a first component within a downhole pumping system to a second component within the downhole pumping system. The adapter includes an upstream section adjacent the first component and a downstream section adjacent the second component. The adapter further includes an articulating joint that permits the angular movement of the first component with respect to the second component. The articulating joint includes a flexible metal casing extending between the upstream section and the downstream section.

In another aspect, the present invention includes a submersible pumping system that has an upstream component, a downstream component and a flexible adapter connected between the upstream component and the downstream component. The flexible adapter includes an upstream section adjacent the upstream component, a downstream section adjacent the downstream component and an articulating joint. The articulating joint permits the angular movement of the first component with respect to the second component. The articulating joint has a flexible metal casing extending between the upstream section and the downstream section.

In yet another aspect, the present invention includes a submersible pumping system that has an upstream component, a downstream component and a flexible adapter connected between the upstream component and the downstream component. The flexible adapter includes an upstream shaft, a downstream shaft and an articulating joint. The articulating joint includes a flexible metal casing extending between the upstream section and the downstream section. The articulating joint further includes a shaft coupling that permits an angular articulation between the upstream shaft and downstream shaft.

DETAILED DESCRIPTION

Figure 1:
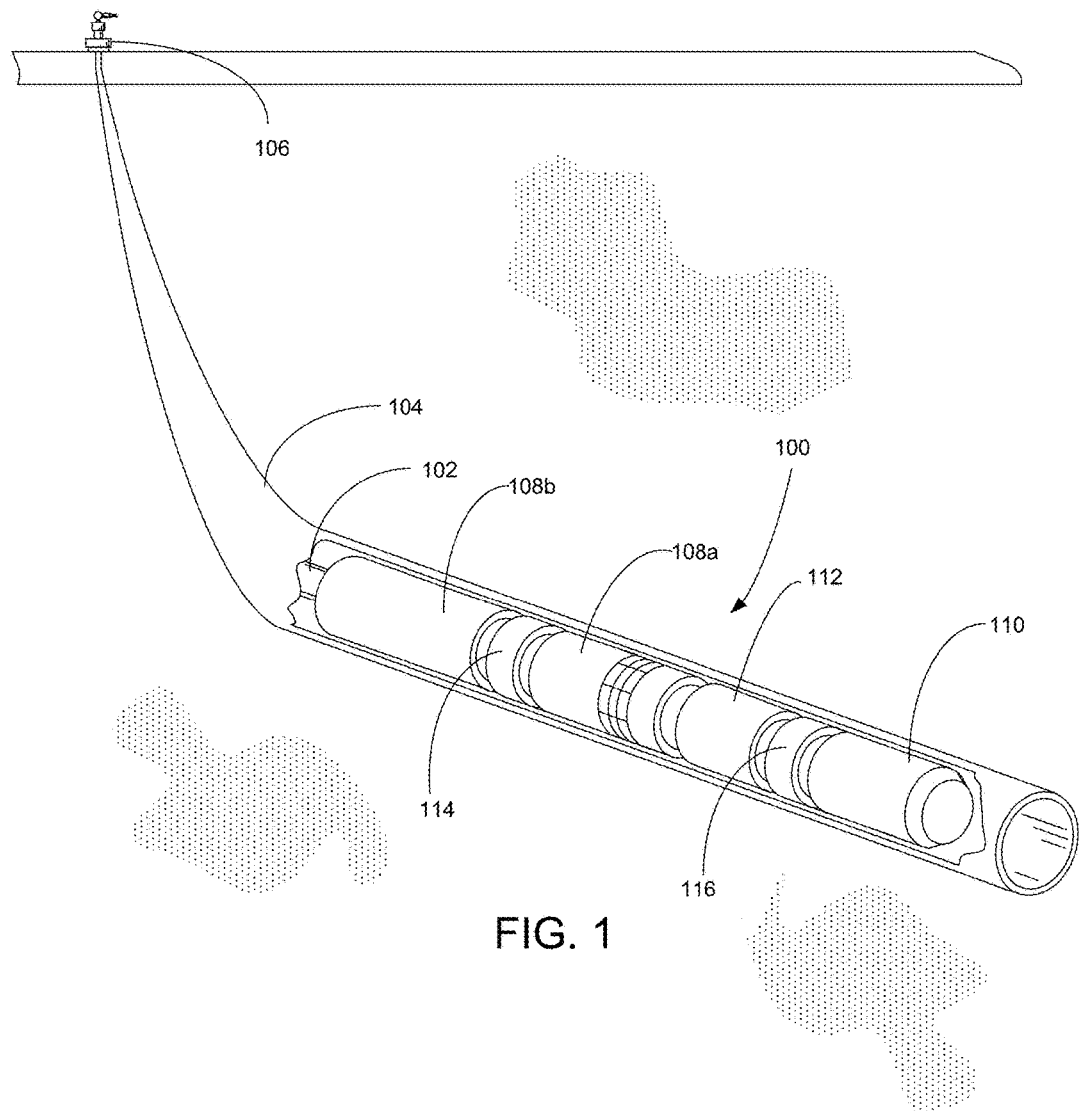
FIG. 1 is a front perspective view of a downhole pumping system.

In accordance with an exemplary embodiment of the present invention, FIG. 1 shows a front perspective view of a downhole pumping system 100 attached to production tubing 102. The downhole pumping system 100 and production tubing 102 are disposed in a wellbore 104, which is drilled for the production of a fluid such as water or petroleum. The downhole pumping system 100 is shown in a non-vertical well. This type of well is often referred to as a "directional," "deviated" or "horizontal" well. Although the downhole pumping system 100 is depicted in a horizontal well, it will be appreciated that the downhole pumping system 100 can also be used in non-horizontal wells.

As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 includes a combination of one or more pump assemblies 108, one or more motor assemblies 110 and one or more seal sections 112. In the embodiment depicted in FIG. 1, the pumping system 100 includes a single motor assembly 110, a single seal section 112 and two separated pump assemblies 108a, 108b. The two pump assemblies 108a, 108b are connected by a flexible pump adapter 114. The pumping system 100 further includes a flexible motor adapter 116 that connects the motor assembly 110 to the seal section 112. As used in this disclosure, the terms "upstream" and "downstream" provide relative positional information for components within the pumping system 100 with reference to the flow of pumped fluids through the pumping system 100. In this way, the pump assembly 108a is the "upstream" pump assembly and the pump assembly 108b is the "downstream" pump assembly. Although a single motor assembly 110 is depicted in FIG. 1, it will be understood that the pumping system 100 may include multiple motor assemblies 110 that are concatenated or trained together. It will further be appreciated that the pumping system 100 may also include multiple seal sections 112.

The motor assembly 110 is an electrical motor that may receive its power from a surface-based supply. The motor assembly 110 converts the electrical energy into mechanical energy, which is transmitted to the pump assemblies 108a, 108b by one or more shafts. The pump assemblies 108a, 108b then transfer a portion of this mechanical energy to fluids within the wellbore, causing the wellbore fluids to move through the production tubing 102 to the surface. In an exemplary embodiment, the pump assemblies 108a, 108b are turbomachines that use one or more impellers and diffusers to convert mechanical energy into pressure head. In an alternative embodiment, the pump assemblies 108a, 108b include a progressive cavity (PC) or positive displacement pump that moves wellbore fluids with one or more screws or pistons. The seal section 112 shields the motor assembly 110 from mechanical thrust produced by the pump assembly 108. The seal section 112 is also configured to prevent the introduction of contaminants from the wellbore 104 into the motor assembly 110.

The flexible pump adapter 114 is configured to connect two adjacent components within the pumping system 100 with a mechanism that permits a degree of angular offset between the components. The flexible pump adapter 114 transfers torque from an upstream component to a downstream component, and includes an internal path for transferring pumped fluids between the two components. Accordingly, the flexible pump adapter 114 is utilized for connecting two components within the pumping system 100 that together provide a path for pumped fluids. As depicted in FIG. 1, the flexible pump adapter 114 provides a fluid flow path from the discharge of the upstream pump assembly 108a to the intake of the downstream pump assembly 108b. Notably, the flexible pump adapter 114 can be used to provide an articulating connection between any two components within the pumping system 100, including, for example, seal section-to-seal section connections and seal section-to-intake adapter connections.

The flexible motor adapter 116 is configured to connect two adjacent components within the pumping system 100 with a mechanism that permits a degree of angular offset between the components. The flexible motor adapter 116 transfers torque from an upstream component to a downstream component, where the connection does not require an internal path for transferring pumped fluids. Accordingly, the flexible motor adapter 116 is designed for connecting two components within the pumping system 100 that do not cooperatively provide a path for pumped fluids. As depicted in FIG. 1, the flexible motor adapter 116 connects the motor assembly 110 and the seal section 112. Notably, the flexible motor adapter 116 can be used to provide an articulating connection between any two components within the pumping system 100, including, for example, to provide an articulating joint for pump assemblies placed below the motor(s) in what is referred to as a "sumped" configuration.

Figure 2:
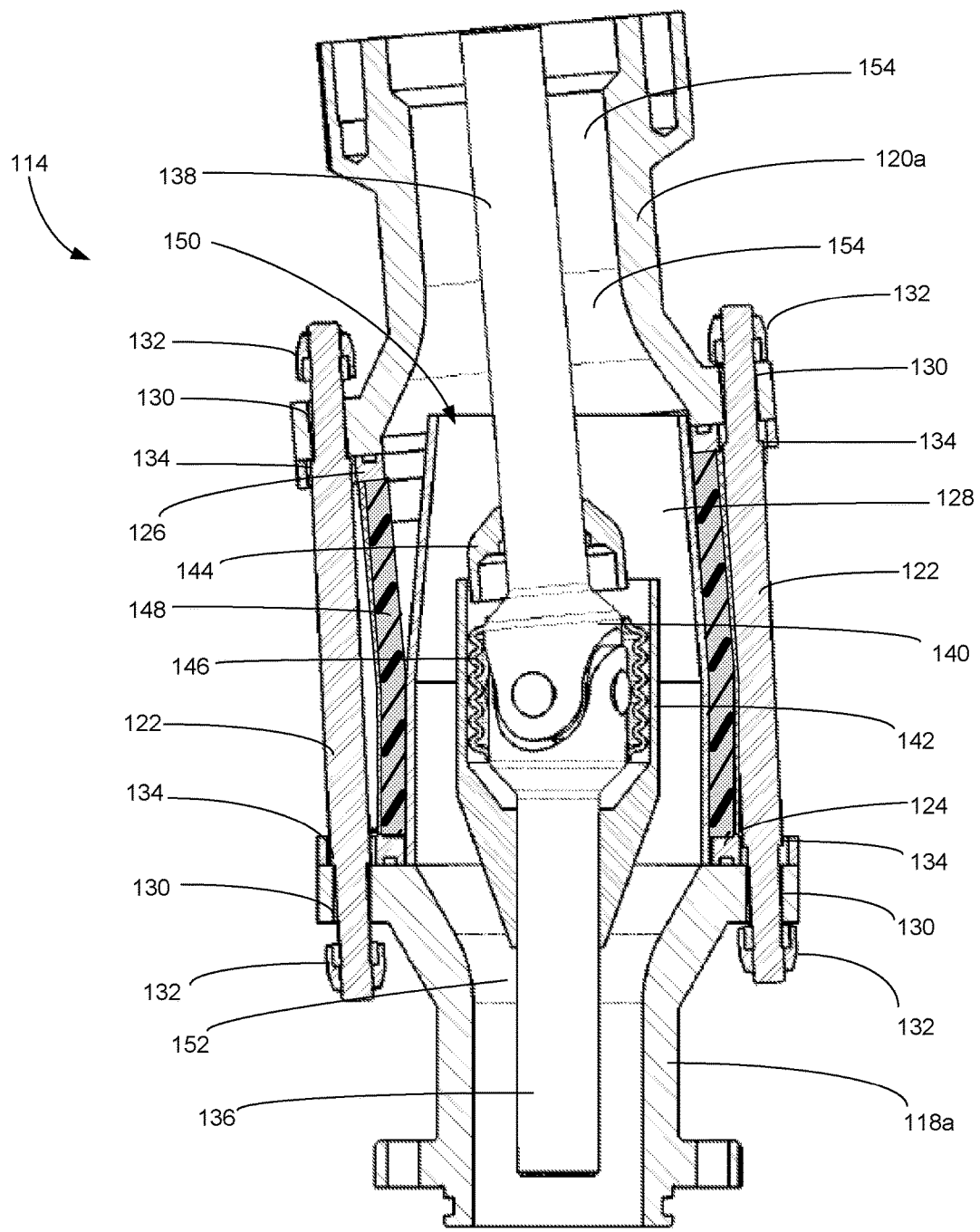
FIG. 2 is a partial cross-sectional view of an embodiment of a flexible pump adapter of the pumping system of FIG. 1.
Figure 12:
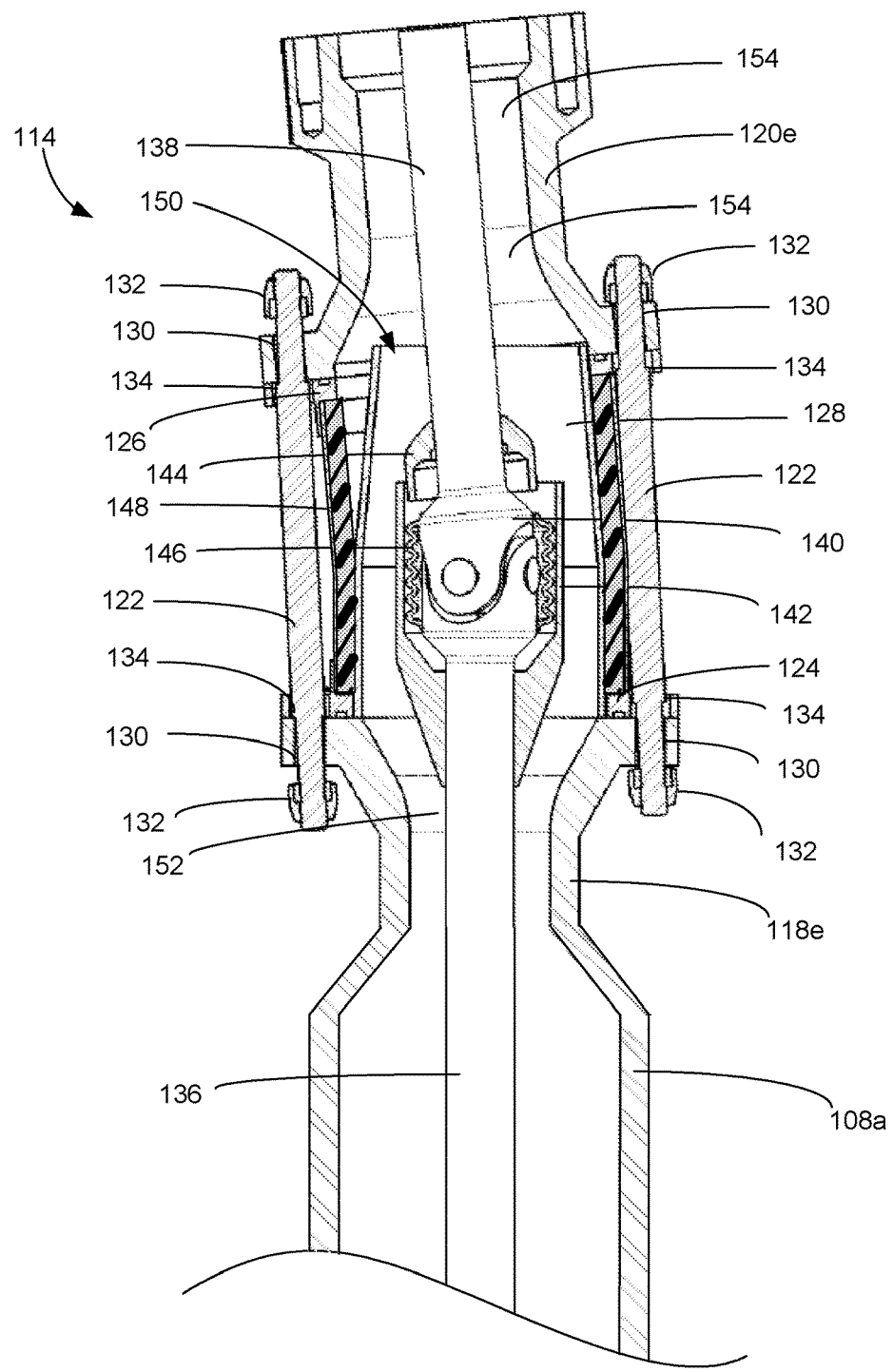
FIG. 12 is a partial cross-sectional view of a first embodiment of the flexible pump adapter of the pumping system of FIG. 1 in which the flexible pump adapter is integral with the upstream pump assembly.

Referring now to FIG. 2, shown therein is a cross-section view of a first embodiment of the flexible pump adapter 114. Generally, the flexible pump adapter 114 provides an articulating connection between two adjacent components with the pumping system 100. The flexible pump adapter 114 includes an upstream section 118a for connecting to an upstream component and a downstream section 120a for connecting to a downstream component. In the embodiment depicted in FIG. 1, the upstream section 118a is connected to the upstream pump assembly 108a and the downstream section 120a is connected to the downstream pump assembly 108b. Unless otherwise noted, each component of the flexible pump adapter 114 is manufactured from a suitable metal or metal alloy, such as, for example, steel, stainless steel, or Inconel. Although the upstream section 118a and downstream section 120a are depicted as separate elements that can be attached to upstream and downstream components within the pumping system 100, it will be understood that the upstream section 118a and downstream section 120a can also be formed as an integral part of the respective upstream or downstream component, as illustrated in FIG. 12. For example, the upstream section 118a could be part of the pump assembly 108a, while the downstream section 120a could be part of the pump assembly 108b. For these embodiments, the flexible pump adapter 114 incorporates elements from the adjacent components within the pumping system 100, including a common upstream shaft 136 extending from the pump assembly 108a into the upstream section 118a.

Turning back to FIG. 2, the flexible pump adapter 114 further includes a plurality of axial bolts 122, an upstream retainer 124, a downstream retainer 126 and a joint guard 128. The axial bolts 122 extend through, and connect, the upstream section 118a and the downstream section 120a. Each of the upstream section 118a and downstream section 120a include axial bolt bores 130 that receive a corresponding one of the plurality of axial bolts 122. The diameter of the axial bolt bores 130 is larger than the outer diameter of the corresponding axial bolts 122. The axial bolts 122 are therefore provided a small degree of lateral movement within the axial bolt bores 130. Each axial bolt 122 includes a pair of axial bolt caps 132 that are configured for threaded engagement with the opposing distal ends of each axial bolt 122. The axial bolt caps 132 are larger than the axial bolt bores 130. Each axial bolt 122 further includes a pair of axial bolt inner limiters 134 located at a predetermined distance from the ends of the axial bolt 122. In the embodiment depicted in FIG. 2, the axial bolt inner limiters 134 are presented as larger diameter shoulders on the axial bolts 122, but it will be appreciated that the axial bolt inner limiters 134 can also be nuts, flanges or pins.

During angular articulation, portions of the upstream section 118a and downstream section 120a separate, while opposite portions approximate. As depicted in FIG. 2, the right-hand side of the upstream section 118a and downstream section -I-24 120a have separated, while the left-hand side of the upstream section 118a and downstream section 120a have been pushed together. The axial bolts 122 on the right-hand side are placed in tension as the axial bolt caps 132 press against the separating portions of the upstream section 118a and downstream section 120a. In contrast, the axial bolts 122 and axial bolt bores 130 positioned on the opposite side of the flexible pump adapter 114 allow the upstream section 118a and downstream section 120a to be drawn together until the upstream section 118a and downstream section 120a contact the axial bolt inner limiters 134. Once the upstream and downstream sections 118a, 120a contact the axial bolt inner limiters 134, the corresponding axial bolts 122 are placed into compression. In this way, the axial bolts 122, axial bolt bores 130, axial bolt caps 132 and axial bolt inner limiters 134 form an "articulating joint" that permits a degree of angular articulation between the upstream section 118a and downstream section 120a, while limiting the rotational movement and axial dislocation between the upstream and downstream sections 118a, 120a. Importantly, the flexible pump adapter 114 is designed to transfer the weight of upstream components within the pumping system 100 to downstream components when the pumping system 100 is placed in a non-horizontal deployment. The axial bolt caps 132 and axial bolt inner limiters 134 provide a facilitated method for controlling the extent of articulation within the flexible pump adapter 114. By adjusting or fixing the relative distances between the axial bolt caps 132 and axial bolt inner limiters 134, the degree of articulation can be consistently controlled.

Continuing with FIG. 2, the flexible pump adapter 114 further includes an adapter drivetrain that includes an upstream shaft 136, a downstream shaft 138 and a shaft coupling 140. The upstream shaft 136 is configured for connection to the upstream component within the pumping system 100 (e.g., the upstream pump assembly 108a) and the downstream shaft 138 is configured for connection to the downstream component within the pumping system 100 (e.g., the downstream pump assembly 108b). The upstream shaft 136 and the downstream shaft 138 are connected by the shaft coupling 140. The shaft coupling 140 is a conventional u-joint mechanism that includes a cross member that connects to offset yokes on the upstream and downstream shafts 136, 138.

Figure 10:
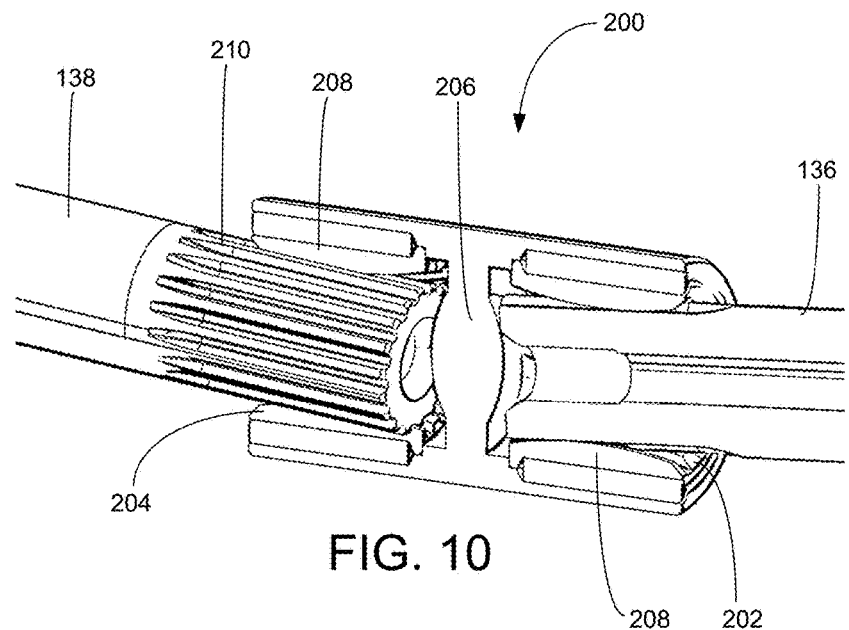
FIG. 10 is a perspective view of a flex receiver constructed in accordance with a first embodiment.
Figure 11:
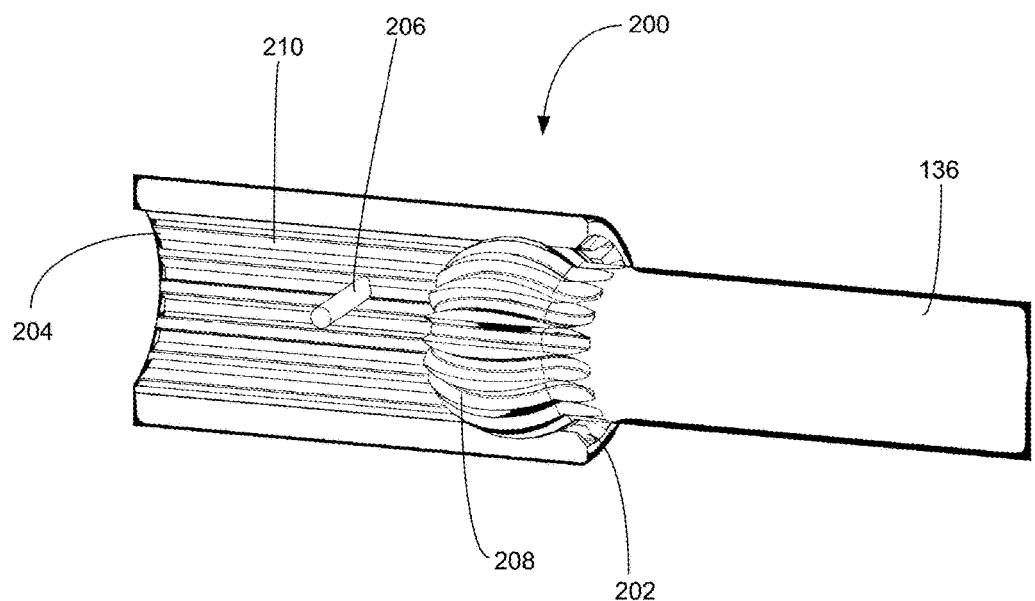
FIG. 11 is a perspective view of a flex receiver constructed in accordance with a second embodiment.

Alternatively, the shaft coupling 140 can be configured as a ball-and-socket arrangement that includes a rounded spline connection with a receiving splined socket. Turning to FIGS. 10 and 11, shown therein are alternative embodiments of the shaft coupling 140. In the embodiment depicted in FIG. 10, the shaft coupling 140 includes a flex receiver 200 that includes an upstream receptacle 202, a downstream receiver 204 and a divider 206. Each of the upstream and downstream receptacles 202, 204 has a series of convex curved splines 208 that mate with straight splines 210 on the ends of the upstream and downstream shafts 136, 138. The convex curved splines 208 may be provided as inserts within the flex receiver 200. The placement of the straight splines 210 within the curved splines 208 allows the upstream and downstream shafts 136, 138 to rock while maintaining contact with the flex receiver 200. The divider 206 limits the axial displacement of the upstream and downstream shafts 136, 138.

In the alternative embodiment depicted in FIG. 11, the flex receiver 200 includes straight splines 210 within the upstream receiver 202 and downstream receiver 204. The ends of the upstream and downstream shafts 136, 138 (only the upstream shaft 136 is depicted in FIG. 11) are provided with convex curved splines 208. In this way, the upstream and/or downstream shafts 136, 138 are allowed to articulate within the flex receiver 200. In an exemplary embodiment, the convex curved splines 208 of the upstream and downstream shafts 136, 138 are presented on a separate head attachment that fits over a standard splined end of the upstream and downstream shafts 136, 138. The use of a separate convex splined shaft adapter reduces manufacturing and material costs and permits the use of the flex receiver 200 with standard shafts. In the embodiment depicted in FIG. 11, the divider 206 includes a single post rather than a larger partition between the upstream and downstream receivers 202, 204. In yet other embodiments, the shaft coupling 140 is configured as a constant velocity (CV) joint or Birfield-type joint.

Returning to FIG. 2, the flexible pump adapter 114 further includes a coupling housing 142, a coupling cap 144 and coupling bellows 146. The coupling housing 142 is secured to the upstream shaft 136 and the coupling cap 144 is secured to the downstream shaft 138. The coupling housing 142 and coupling cap 144 cooperate to shield the shaft coupling 140 from debris and fluids moving through the flexible pump adapter 114. The coupling bellows 146 isolate the shaft coupling 140 from fluid and debris present within the coupling housing 142. The coupling bellows 146 are manufactured from a folded and flexible elastomer or polymer. To further protect the shaft coupling 140, a second bellows (not shown) may be used to prevent migration of fluid and debris between the coupling cap 144 and the coupling housing 142. Alternatively, the coupling bellows 146 are manufactured from a metal or a combination of metal and polymer.

The joint guard 128 surrounds the shaft coupling 140, the coupling housing 142 and the coupling cap 144. The joint guard 128 is configured as a substantially cylindrical tube, with a tapered downstream end. The upstream end of the joint guard 128 is held in position adjacent the upstream section 118a by the upstream retainer 124. Alternatively, the upstream end of the joint guard 128 can be connected to the upstream section 118a with a welded or threaded connection, or presented as a unitary construction. The conical shape of the downstream side of the joint guard 128 allows the upstream and downstream sections 118a, 120a to articulate.

To isolate the interior of the flexible pump adapter 114 from the surrounding wellbore 104, the flexible pump adapter 114 includes a flexible outer housing 148. The outer housing 148 is constructed from a flexible, impermeable material that is sufficiently durable to withstand the internal pressures of the pumped fluid and the inhospitable external environment. Suitable materials include creased metal, woven metal mesh and elastomers. In an exemplary embodiment, the outer housing 148 includes a woven metal mesh exterior with a polymer liner. Suitable polymers include polytetrafluoroethylene (PTFE), perfluoroalkoxy (PFA), polyetheretherketone (PEEK), tetrafluoroethylene/propylene (TFE/P)(Aflas), fluorine terpolymer (FKM) (Viton), highly saturated nitrile (HSN) or hydrogenated nitrile butadiene rubber (HNBR), and metallized polymers. The outer housing 148, joint guard 128, coupling housing 142 and coupling cap 144 cooperate to protect the shaft coupling 140 while permitting the upstream and downstream sections 118a, 120a to articulate.

It will be noted that the flexible pump adapter 114 also includes an internal fluid passage 150 for pumped fluids exchanged between the upstream and downstream components connected to the flexible pump adapter 114. To this end, the upstream section 118a includes an upstream section throat 152 and the downstream section 120a includes a downstream section throat 154. The upstream section throat 152 includes an annular space around the upstream shaft 136. The downstream section throat 154 includes an annular space around the downstream shaft 138. The fluid passage 150 is created by the annular spaces within the upstream and downstream section throats 152, 154 and the annular space between the joint guard 128 and the coupling housing 142 and coupling cap 144.

Accordingly, although it is not required that the flexible pump adapter 114 be connected between adjacent pump assemblies 108, the flexible pump adapter 114 is particularly well-suited for providing a point of articulation between two components within the pumping system 100 that are configured for providing a passage for the movement of pumped fluids. It will be noted, however, that in certain applications, it may be desirable to remove the upstream and downstream shafts 136, 138, the shaft coupling 140, the coupling housing 142, the coupling cap 144 and the coupling bellows 146. In these alternate embodiments, the flexible pump adapter 114 is not configured to transfer torque from an upstream shaft to a downstream shaft, but only provides a point of articulation between two components within the pumping system 100 that are configured for providing a passage for the movement of pumped fluids. For example, it may be desirable to use the flexible pump adapter 114 without the adapter drivetrain to connect the discharge side of the pump assembly 108b to the production tubing 102.

Figure 3:
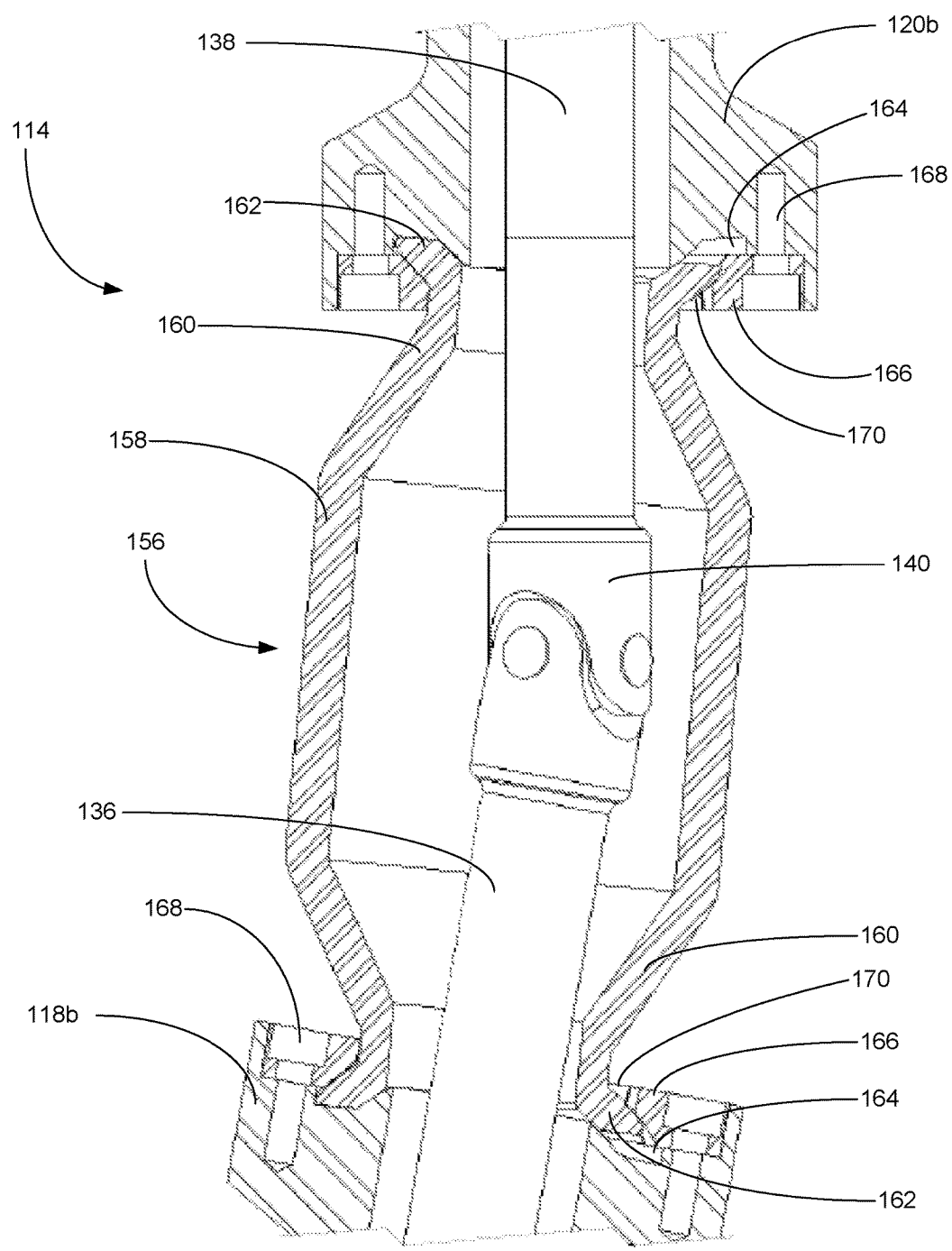
FIG. 3 is a partial cross-sectional view of a second embodiment of a flexible pump adapter of the pumping system of FIG. 1.

Turning to FIG. 3, shown therein is a cross-sectional depiction of a second embodiment of the flexible pump adapter 114. Unless otherwise indicated, the second embodiment of the flexible pump adapter 114 includes the same components identified during the description of the first embodiment shown in FIG. 2. Unlike the first embodiment, the second embodiment does not include axial bolts 122 that extend through axial bolt bores 130 in the upstream and downstream sections 118b, 120b.

Instead, the second embodiment of the flexible pump adapter 114 makes use of an articulating joint formed by a rigid joint chamber 156 that is pivotally connected to the upstream and downstream sections 118b, 120b.

The joint chamber 156 is cylindrical and includes a large central chamber 158 that tapers on both ends to flange ends 160. The central chamber accommodates the lateral displacement of the shaft coupling 140 during the articulation of the flexible pump adapter 114. The joint chamber 156 includes flared ends 162 at the open end of each flange end 160.

The upstream and downstream sections 118b, 120b both include a receiving recess 164 that is configured to receive the flared end 162 of the joint chamber 156. Each of the upstream and downstream sections 118b, 120b further includes a locking collar 166 that captures the flared ends 162 of the joint chamber 156 within the respective upstream and downstream section 118b, 120b. The locking collars 166 are secured to flanges of upstream and downstream sections 118b, 120b with collar bolts 168. In an exemplary embodiment, the locking collar 166 is configured as a split collar that includes two or more separate pieces that can be placed around the outside of the flange ends 160 of the joint chamber 156. The locking collars 166 include a central opening 170 that extends the receiving recess 164 of the upstream and downstream sections 118b, 120b. Although the locking collars 166 are shown bolted to the upstream and downstream sections 118b, 120b, the locking collars 166 may alternatively be configured for a threaded engagement with the upstream and downstream sections 118b, 120b.

The receiving recesses 164 and locking collars 166 are configured to permit the slight movement of the flared ends 162 relative to the upstream and downstream sections 118b, 120b. Thus, the flared ends 162 are somewhat loosely captured within the receiving recesses 164, but prohibited from being removed from the receiving recesses 164 of the locking collar 166. This permits the angular articulation of the upstream and downstream sections 118b, 120b around the joint chamber 156. In a variation of this embodiment, the receiving recesses 164 are machined with close tolerances to the width of the flared ends 162 such that the extent of articulation is limited as the flared ends 160 bind within the receiving recesses 164. In addition to limiting the extent of articulation, the close tolerances presented between the flared ends 162 and the receiving recess 164 creates a substantially impermeable seal between the upstream and downstream sections 118b, 120b and the joint chamber 156.

Figure 4:
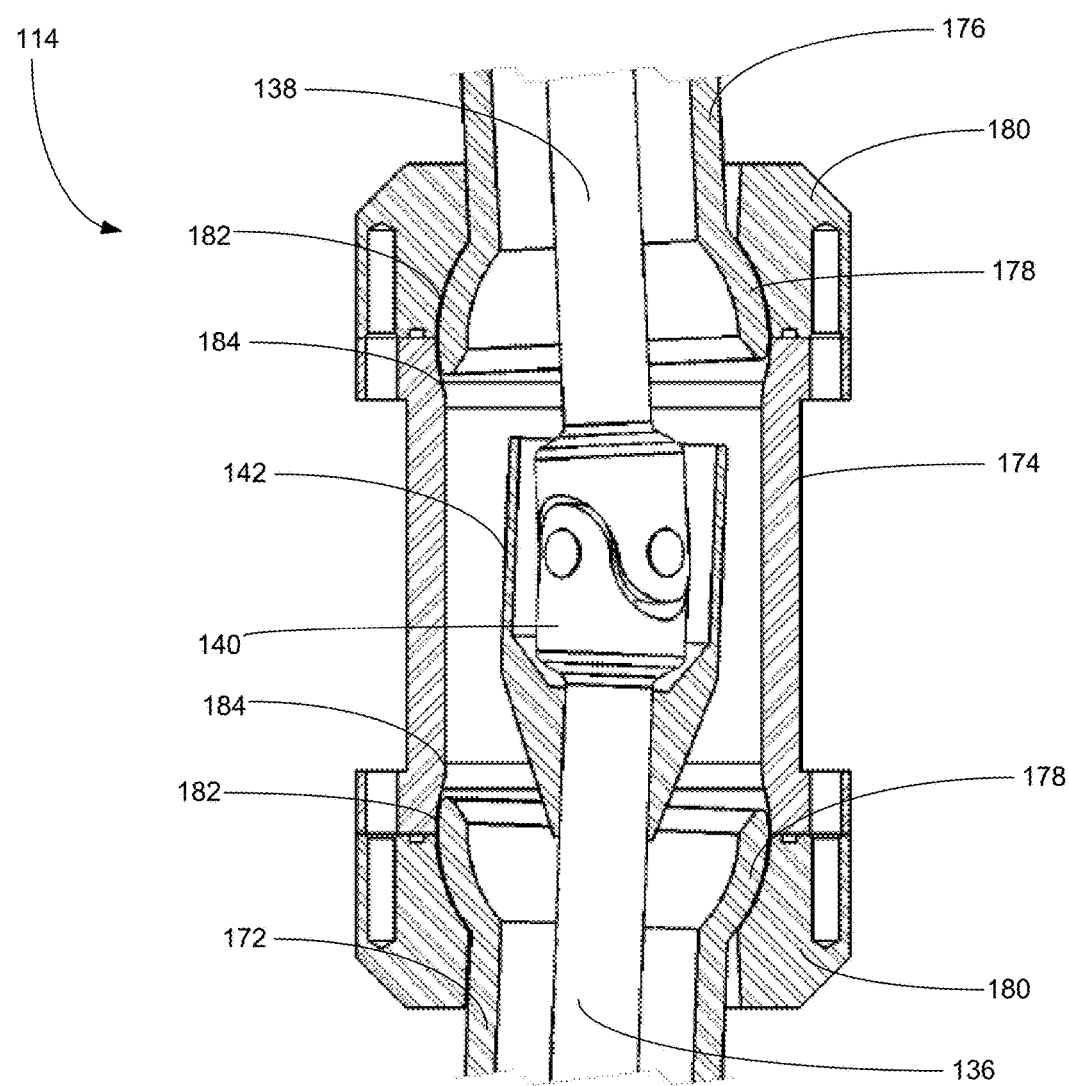
FIG. 4 is a partial cross-sectional view of a third embodiment of a flexible pump adapter of the pumping system of FIG. 1.

Turning to FIG. 4, shown therein is a cross-sectional depiction of a third embodiment of the flexible pump adapter 114. Unless otherwise indicated, the third embodiment of the flexible pump adapter 114 includes the same components identified during the description of the first embodiment shown in FIG. 2. Unlike the first embodiment, the third embodiment does not include axial bolts 122 that extend through axial bolt bores 130 in the upstream and downstream sections 118a, 120a. Instead, the third embodiment of the flexible pump adapter 114 makes use of an articulating joint formed by pivoting flanges connected to a rigid joint chamber that together provide a degree of articulation.

In the third embodiment, the flexible pump adapter 114 includes an upstream pivot section 172, a fixed coupling chamber 174 and a downstream pivot section 176. Each of the upstream and downstream pivot sections 172, 176 includes a rounded base 178. The flexible pump adapter 114 further includes cap pieces 180 that hold the upstream pivot section 172 and downstream pivot section 176 in place within the fixed coupling chamber 174. The cap pieces 180 are bolted onto the coupling chamber 174. Alternatively, the cap pieces 180 may be configured for a threaded engagement with the upstream and downstream pivot sections 172, 176. Although not depicted in FIG. 4, it may be desirable in certain applications to place a bellows, boot or other articulating sealing mechanism around the outer surfaces of the cap pieces 180 and the respective upstream and downstream pivot sections 172, 176. The outer sealing mechanism further restricts the passage of fluids into, and out of, the fixed coupling chamber 174.

The fixed coupling chamber 174 and the cap pieces 180 each include an interior profile that forms a socket 182 that matingly receives the rounded base of each of the upstream and downstream pivot sections 172, 176. The interior profile of the coupling chamber 174 further includes an interior shoulder 184 that prevents the upstream and downstream pivot sections 172, 176 from being pushed into the coupling chamber 174. In this way, the coupling chamber 174, cap pieces 180 and the rounded bases 178 of the upstream and downstream pivot sections 172, 176 create a ball-and-socket articulating joint that permits angular articulation about the flexible pump adapter 114, but resists separation or compression along the longitudinal axis of the flexible pump adapter 114.

Figure 5:
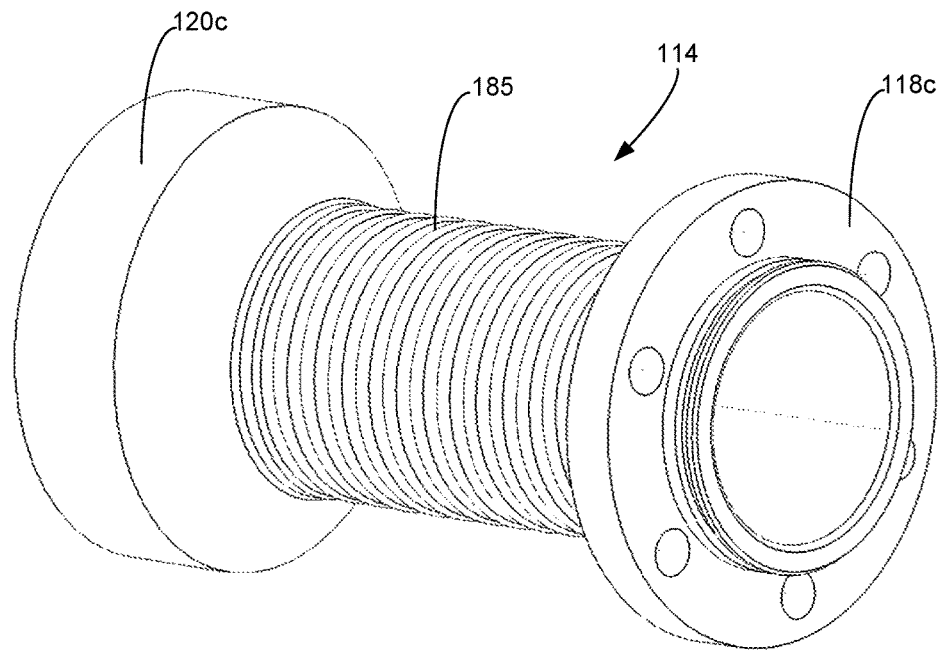
FIG. 5 is a perspective view of a fourth embodiment of a flexible pump adapter of the pumping system of FIG. 1.
Figure 6:
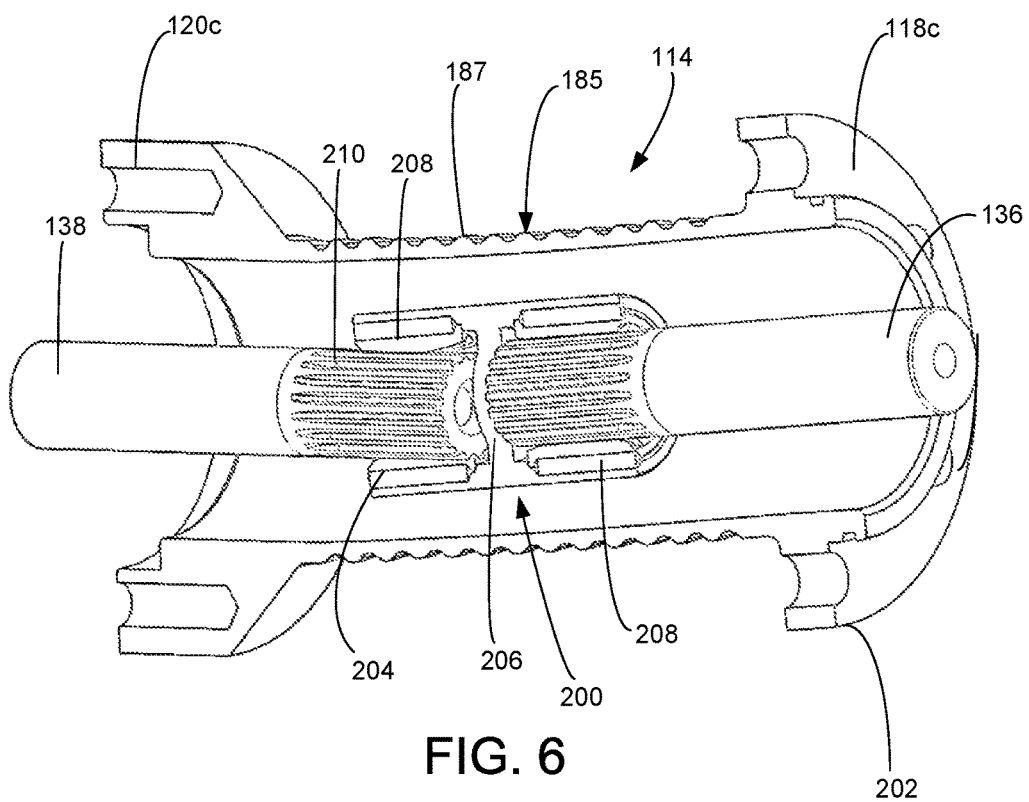
FIG. 6 is a cross-sectional view of the fourth embodiment of FIG. 5.

Turning to FIGS. 5 and 6, shown therein are perspective and cross-sectional views, respectively, of a fourth embodiment of the flexible pump adapter 114. In the fourth embodiment, the flexible pump adapter 114 includes a flexible metal casing 185 extending between the upstream section 118c and the downstream section 120c. The flexible metal casing 185 is constructed by creating spiral or parallel grooves around the outer diameter of a metal cylinder. The resulting ribbed exterior 187 of the metal casing 185 permits a degree of bending when exposed to lateral stress, but will not crush under axial (longitudinal) stress. In addition to the ribbed exterior 187, the metal casing 185 may optionally, or alternatively, include a ribbed internal surface (not shown in FIGS. 5 and 6). Although the metal casing 185 is depicted as a unitary part of the upstream section 118c and downstream section 120c, it will be appreciated that the metal casing 185 can be manufactured as a separate component that can be attached to the upstream and downstream sections 118c, 120c. As depicted in FIG. 6, the fourth embodiment of the flexible pump adapter 114 includes the flex receiver 200 between the upstream and downstream shafts 136, 138. It will be noted that fourth embodiment of the flexible pump adapter 114 can employ other shaft couplings 140, and can also be used without shafts.

Figure 7:
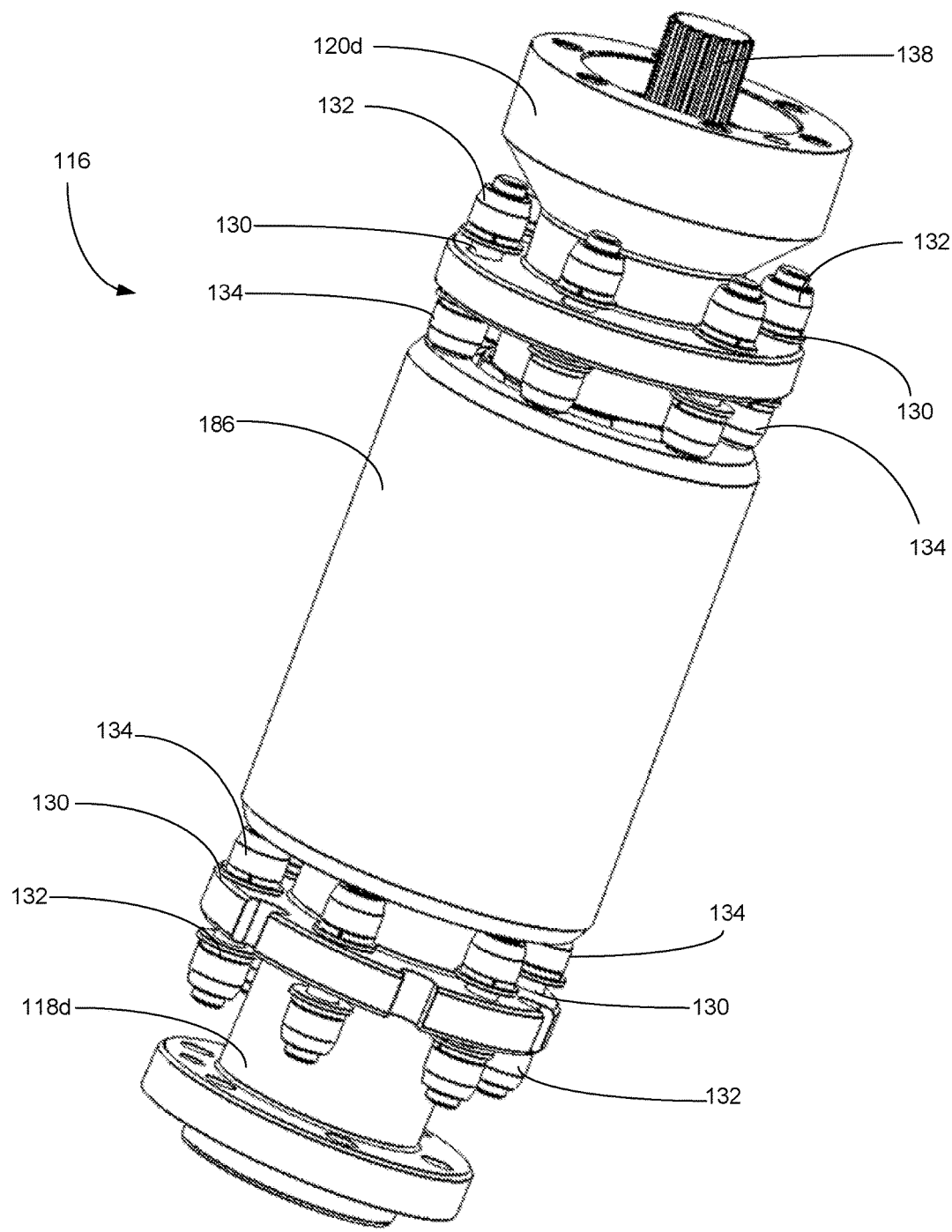
FIG. 7 is a perspective view of a flexible motor adapter constructed in accordance with a first embodiment.
Figure 8:
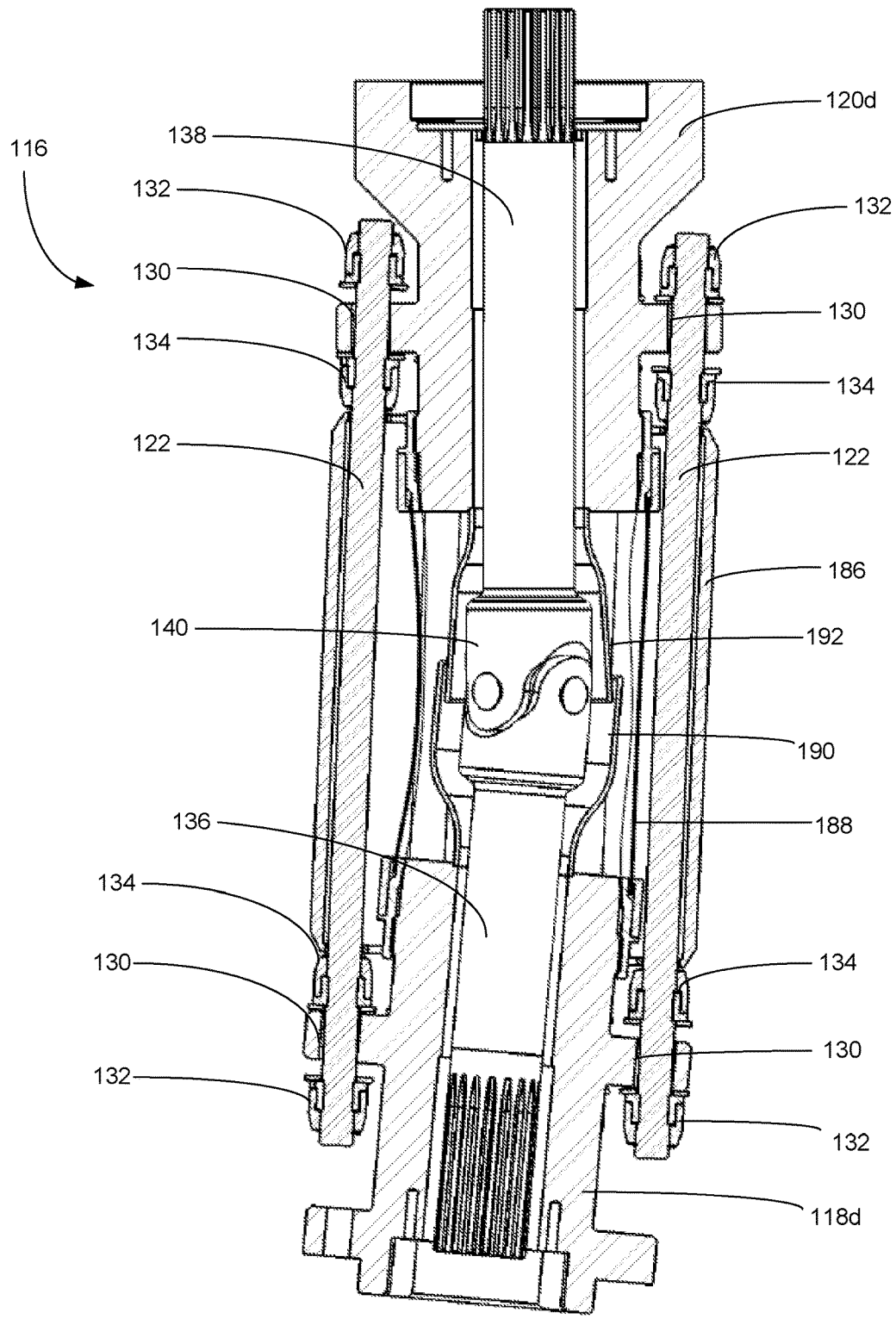
FIG. 8 is a cross-sectional view of the flexible motor adapter of FIG. 7.

Turning now to FIGS. 7 and 8, shown therein are perspective and cross-sectional views, respectively, of the flexible motor adapter 116. Unless otherwise indicated, the flexible motor adapter 116 includes the same components identified during the description of the first embodiment of the flexible pump adapter 114 shown in FIG. 2. Unlike the flexible pump adapter 114, however, the flexible motor adapter 116 does not include the fluid passage 150 and is not configured to permit the passage of pumped fluids between components connected to the flexible motor adapter 116. Instead, the flexible motor adapter 116 is configured to transfer torque with a flexible connection between two components of the pumping system 100. It will be noted that the flexible motor adapter 116 includes passages to permit the passage of motor lubricants or other internal fluids between adjacent components within the pumping system 100. The flexible motor adapter 116 may also include pass-through ports that permit the internal routing of electrical wiring between adjacent components within the pumping system 100.

The flexible motor adapter 116 includes an exterior shield 186 and an interior barrier 188. In an exemplary embodiment, the exterior shield 188 rides between the axial bolt inner limiters 134, which are configured as nuts in this embodiment. In this way, the exterior shield 186 is not rigidly affixed to the upstream and downstream sections 118d, 120d. The exterior shield 186 is constructed from a suitable metal or metal alloy and protects the axial bolts 122 and interior barrier 188 from mechanical impact and abrasion.

The interior barrier 188 extends between the upstream retainer 124 and the downstream retainer 126. The interior barrier 188 is constructed from a flexible, impermeable membrane that prohibits the passage of external fluids into the interior of the flexible motor adapter 116. In an exemplary embodiment, the interior barrier 188 is manufactured from a polymer, such as, for example, polytetrafluoroethylene (PTFE), perfluoroalkoxy (PFA), polyetheretherketone (PEEK), tetrafluoroethylene/propylene (TFE/P)(Aflas), fluorine terpolymer (FKM) (Viton), highly saturated nitrile (HSN) or hydrogenated nitrile butadiene rubber (HNBR), and metallized polymers.

Figure 9:
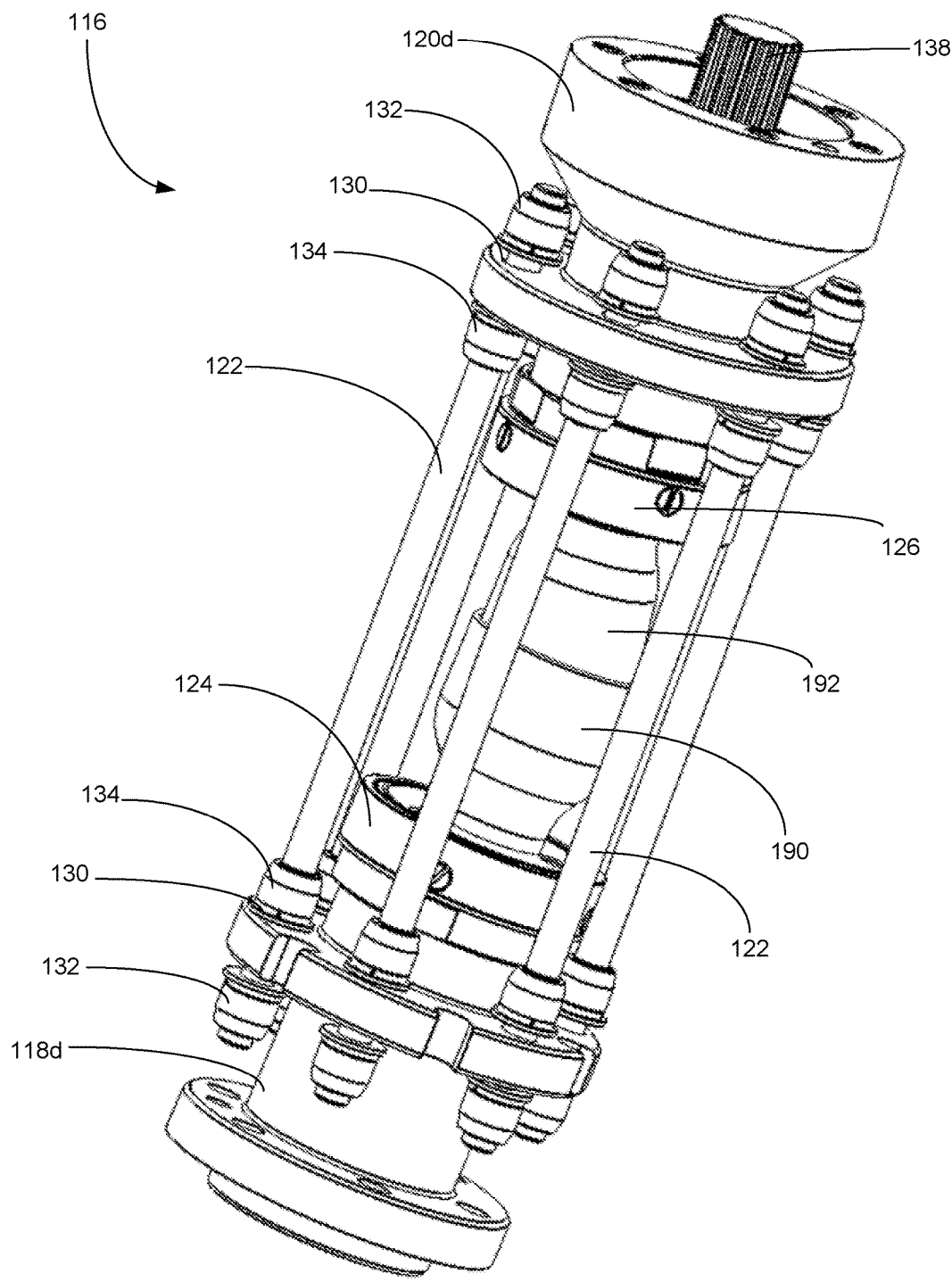
FIG. 9 is a perspective view of the flexible motor adapter of FIG. 7 with the outer shield and inner membrane removed for clarity.

Referring now also to FIG. 9, shown therein is a perspective view of the flexible motor adapter 116 with the exterior shield 186 and the interior barrier 188 removed for clarity. The flexible motor adapter 116 includes an upstream cup 190 and a downstream cup 192 that are each attached, respectively, to the upstream and downstream sections 118d, 120d. The upstream cup 190 and downstream cup 192 are sized such that the open end of one of the cups fits within the open end of the other cup. In the embodiment depicted in FIGS. 7 and 8, the downstream cup 192 partially extends inside the upstream cup 190. The upstream and downstream cups 190, 192 protect the flexible interior barrier 188 from contact with the rotating shaft coupling 140 and critical internal components.

Accordingly, the flexible motor adapter 116 is well-suited for providing a point of articulation between two components within the pumping system 100 through which a shaft is used to transfer mechanical energy. It will be noted, however, that in certain applications, it may be desirable to remove the upstream and downstream shafts 136, 138, the shaft coupling 140 and the upstream and downstream cups 190, 192. In these alternate embodiments, the flexible motor adapter 116 is not configured to transfer torque from an upstream shaft to a downstream shaft, but only provides a point of articulation between two components within the pumping system 100. For example, it may be desirable to use the flexible motor adapter 116 without the drivetrain to connect the motor assembly 110 to monitoring modules connected upstream of the motor assembly 110. Furthermore, although the flexible motor adapter 116 has been described with an articulating joint that uses axial bolts 122 and axial bolt bores 130, it will be appreciated that the flexible motor adapter 116 can also employ the articulating joints depicted in the second and third embodiments of the flexible pump adapter 114. Specifically, it is contemplated that the flexible motor adapter 116 can make use of the flared-end and recess articulating joint depicted in FIG. 3 and the ball-and-socket articulating joint depicted in FIG. 4. It will also be noted that some of the embodiments contemplate the use of multiple flexible pump adapters 114 and flexible motor adapters 116. As non-limiting examples, two flexible pump adapters 114 or two flexible motor adapters 116 can be connected to provide articulating joints that provide an increased range of motion. In certain embodiments, it may be desirable to include a series of radial support bearings within the flexible motor adapter 116 or flexible pump adapter 114 to support the upstream and downstream shafts 136, 138 if they are rotated while in an offset angular alignment.

Figure 13:
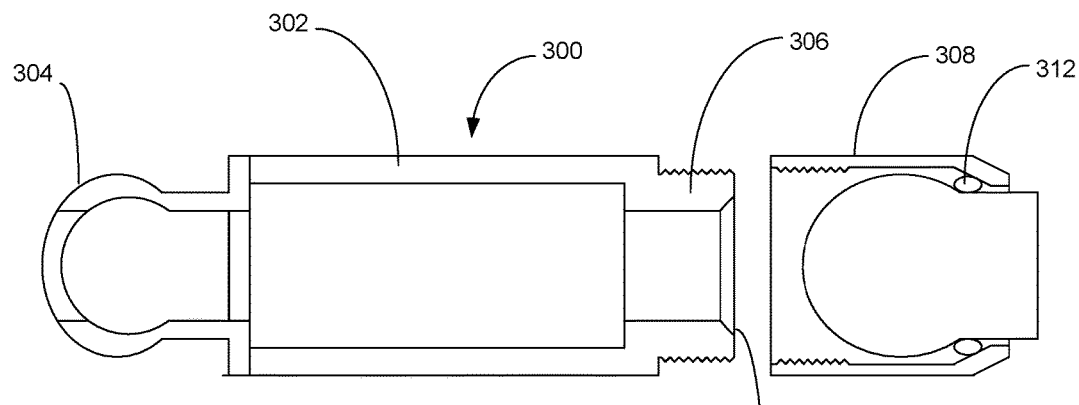
FIG. 13 is a partial cross-sectional view of an articulating component that includes an integral articulating joint constructed in accordance with a fifth embodiment.

Turning to FIG. 13, shown therein is a partial cross-sectional view of an articulating component 300. The articulating component 300 includes a body 302, a ball 304, a socket 306 and a locking collar 308. Like the flexible pump adapter 114 and flexible motor adapter 116, the articulating component 300 can be configured to transmit pumped fluids and torque through internal shafts or linkages. Generally, the articulating component 300 is configured to provide an integral ball-and-socket connection between adjacent components within the pumping system 100. For example, the articulating component 300 may include any component within the pumping system 100, including a pump, motor, seal section, sensor package, intake, gas separator, or production tubing.

Figure 14A:
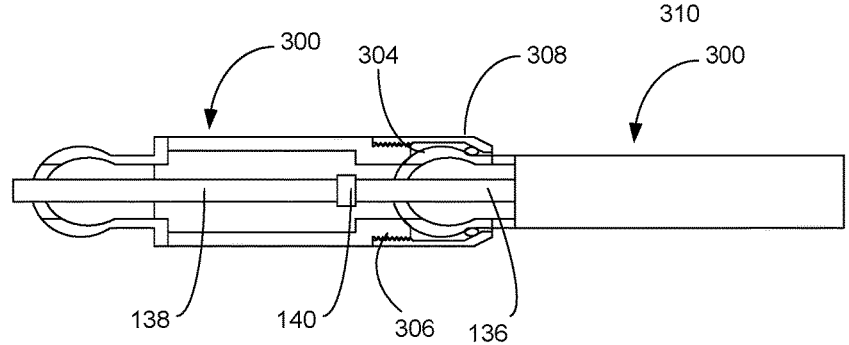
FIG. 14a is a partial cross-sectional view of two articulating components connected by the integral articulating joint of FIG. 13.
Figure 14B:
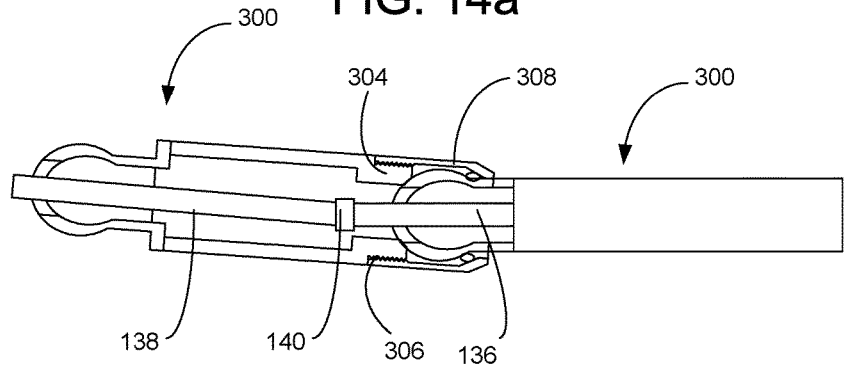
FIG. 14b is a partial cross-sectional view of two articulating components connected by the integral articulating joint of FIG. 13.

FIGS. 14a and 14b illustrate the connection between two adjacent articulating components 300 that include an upstream shaft 136, a downstream shaft 138 and a shaft coupling 140. The unitary locking collar 308 is configured for threaded engagement with the socket 306. The socket 306 includes a bowl 310 that is configured to receive the ball 304 of the adjacent component 300. The unitary locking collar 308 is designed to be placed over the ball 304 of an adjacent articulating component 300. Screwing the locking collar 308 onto the threaded socket 306 approximates the ball 304 of the adjacent articulating component 300 to the socket 306. In an exemplary embodiment, the locking collar 308 includes one or more seal rings 312 that provide a redundant seal around the ball 304. In this way, the ball-and-socket mechanism of the articulating components 300 provides a jointed connection between adjacent components within the pumping system 100. Notably, the use of the ball-and-socket mechanism provides both angular and rotational articulation between the adjacent components 300.

Figure 15:
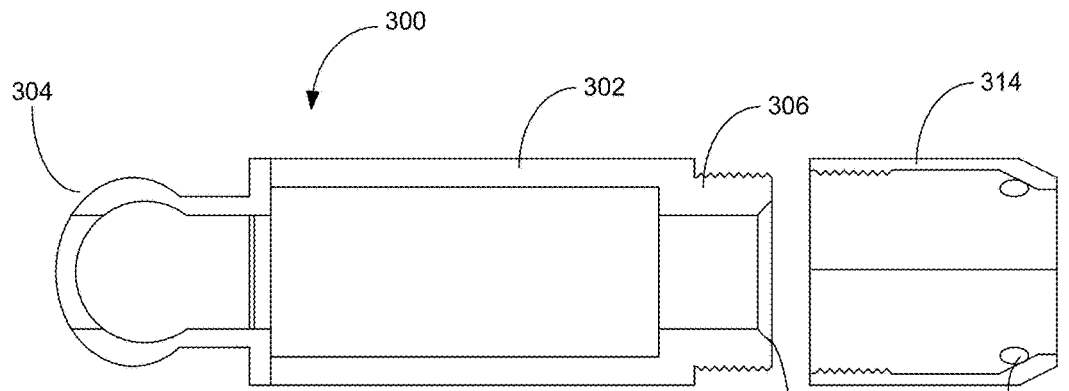
FIG. 15 is a partial cross-sectional view of an articulating component that includes an articulating joint constructed in accordance with a sixth embodiment.
Figure 16A:
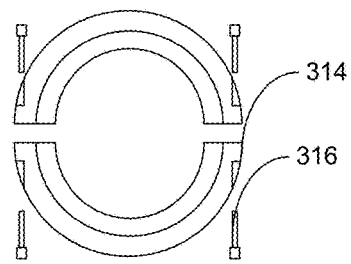
FIG. 16a is a front view of the split-ring locking collar of the integral articulating joint of FIG. 15 in disassembled condition.
Figure 16B:
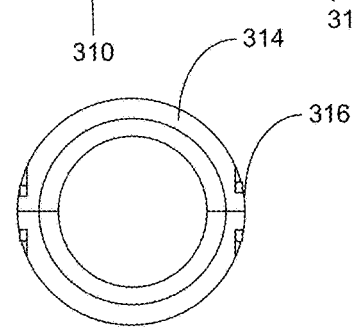
FIG. 16b is a front view of the split-ring locking collar of the integral articulating joint of FIG. 15 in assembled condition.
Figure 17A:
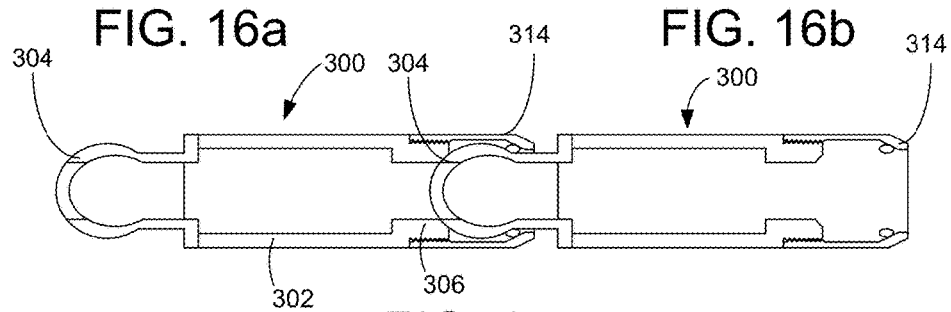
FIG. 17a is a partial cross-sectional view of two articulating components connected by the integral articulating joint of FIG. 15.
Figure 17B:
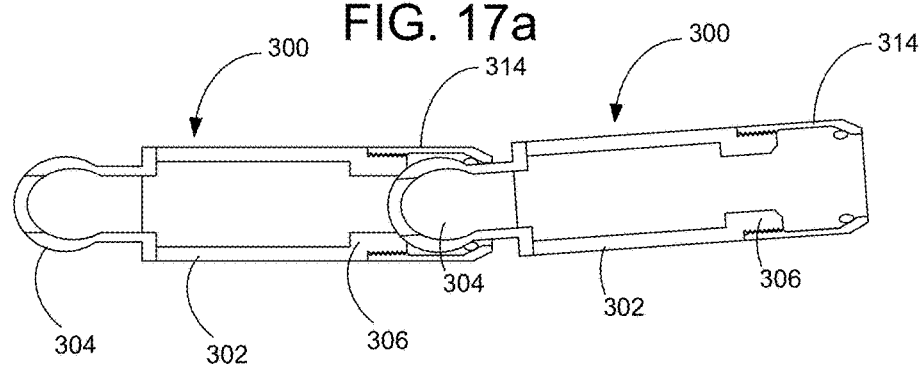
FIG. 17b is a partial cross-sectional view of two articulating components connected by the integral articulating joint of FIG. 15.

Turning to FIG. 15, shown therein is a cross-sectional view of an alternate embodiment of the articulating component 300. The alternate embodiment depicted in FIG. 15 includes a split-ring locking collar 314. As best illustrated in FIGS. 16a and 16b, the split-ring locking collar 314 is configured as separate halves that are joined together with fasteners 316. The split-ring locking collar 314 is useful in applications where the unitary threaded locking collar 308 is unable to fit over the upstream articulating component 300. The use of the split-ring locking collars 314 is depicted in FIGS. 17a and 17b, which illustrate the angular movement between adjacent articulating components 300. In the embodiment depicted in FIGS. 17a and 17b, the articulating components 300 are configured to pass fluids like the flexible pump adapter 114 and do not include torque-transferring shafts found in the flexible motor adapter 116. Such components may include, for example, articulated production tubing and pump discharge heads.

Figure 18:
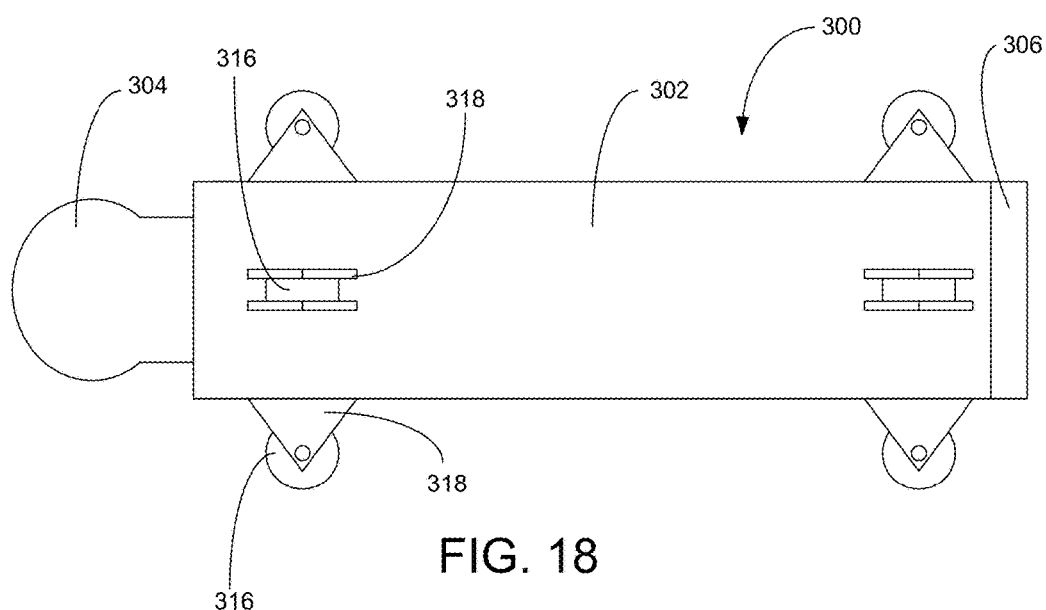
FIG. 18 is a side view of an articulating component incorporating casters.
Figure 19:
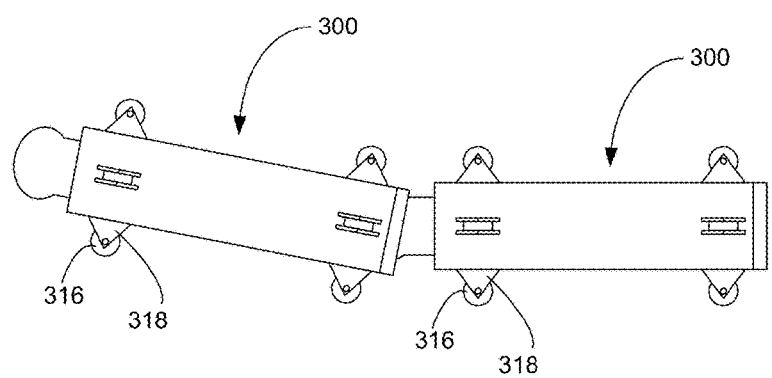
FIG. 19 is a side view of a pair of articulating components of FIG. 18.

Turning to FIG. 18, shown therein is a side view of an articulating component 300 constructed in accordance with another embodiment. In the embodiment depicted in FIG. 18, the articulating component 300 includes a series of rollers along the body 302. In the embodiment depicted in FIG. 18, the rollers are casters 316 that include a mount 318 to which each caster 316 is secured. The use of casters 316 allows the component 300 to roll along the wellbore 104. In the embodiment depicted in FIG. 18, the articulating component 300 includes eight casters 316 disposed about the body 302. It will be appreciated, however, that fewer or greater numbers of casters 316 is encompassed within the scope of some embodiments. FIG. 19 illustrates two adjacent articulating components 300 that include casters 316.

Figure 20:
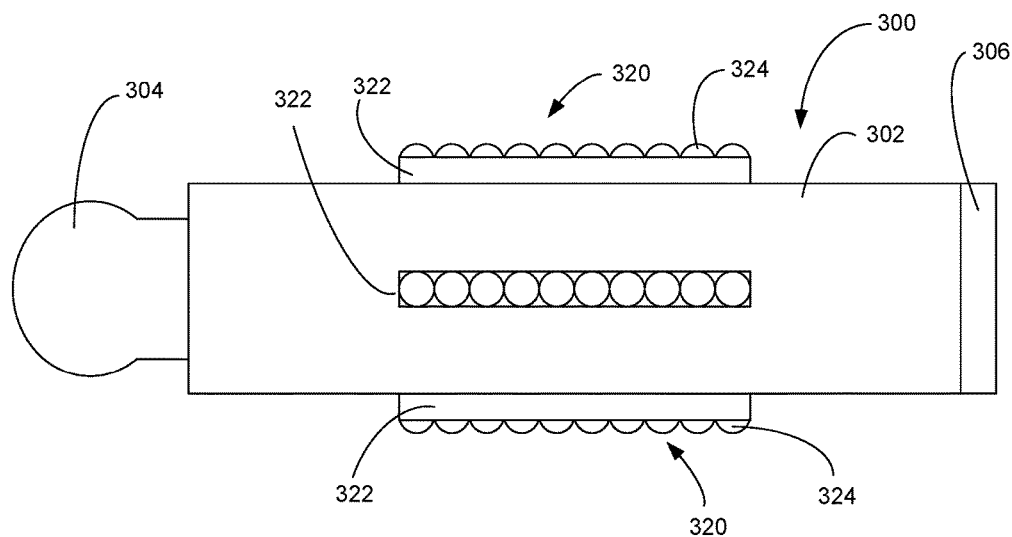
FIG. 20 is a side view of an articulating component incorporating bearing strips.

Turning to FIG. 20, shown therein is a side view of the articulating component 300 with an alternate embodiment of the rollers. In the embodiment depicted in FIG. 20, the articulating component 300 includes a plurality of angularly offset bearing strip assemblies 320. Each bearing strip assembly 320 includes a base block 322 fixed to the body 302 and a plurality of substantially spherical bearings 324. The spherical bearings 324 are configured to rotate within the base block 322 to facilitate the movement and centralization of the component 300 within the wellbore 104. In an exemplary embodiment, there are four, six or eight bearing strip assemblies 320 disposed about the circumference of the body 302. In an alternate embodiment, the base block 322 is incorporated as a unitary part of the body 302 to provide for a lower profile component 300.

Figure 21:
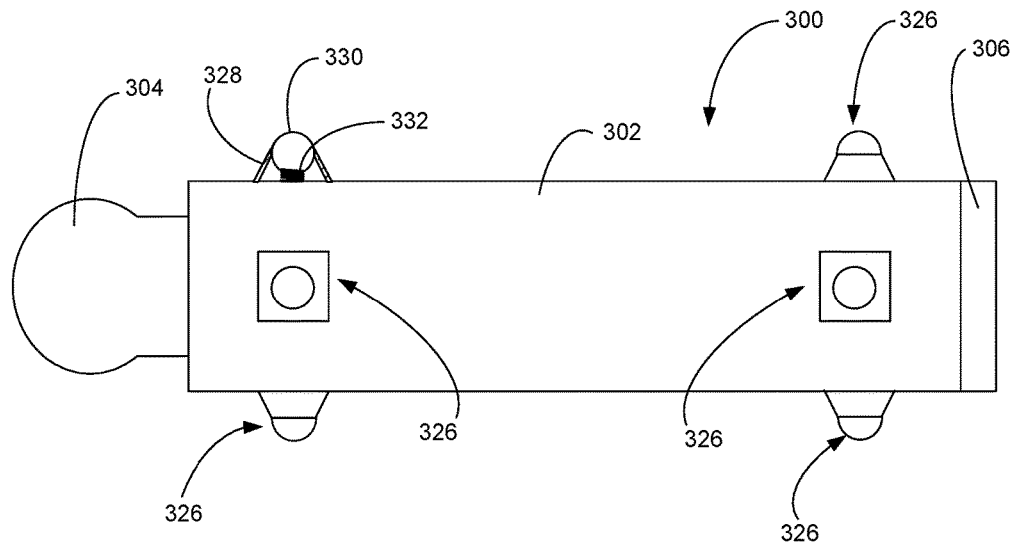
FIG. 21 is a side view of an articulating component incorporating ball-point rollers.

FIG. 21 provides a partial cross-sectional side view of a component 300 constructed in yet another embodiment. As depicted in FIG. 21, the component 300 includes rollers that are embodied by ball-point roller assemblies 326. Each ball-point roller assembly includes a pedestal 328 mounted to the body 302 and a roller ball 330 captured within the pedestal 328. In an exemplary embodiment, one or more of the ball-point roller assemblies 326 further includes a spring 332 within the pedestal 328 that provides the roller ball 330 with a degree of vertical articulation. It will be appreciated that in low-profile applications, it may be desirable to integrate the roller ball 330 and optional spring 332 into the body 302 of the component 300.

Figure 22:
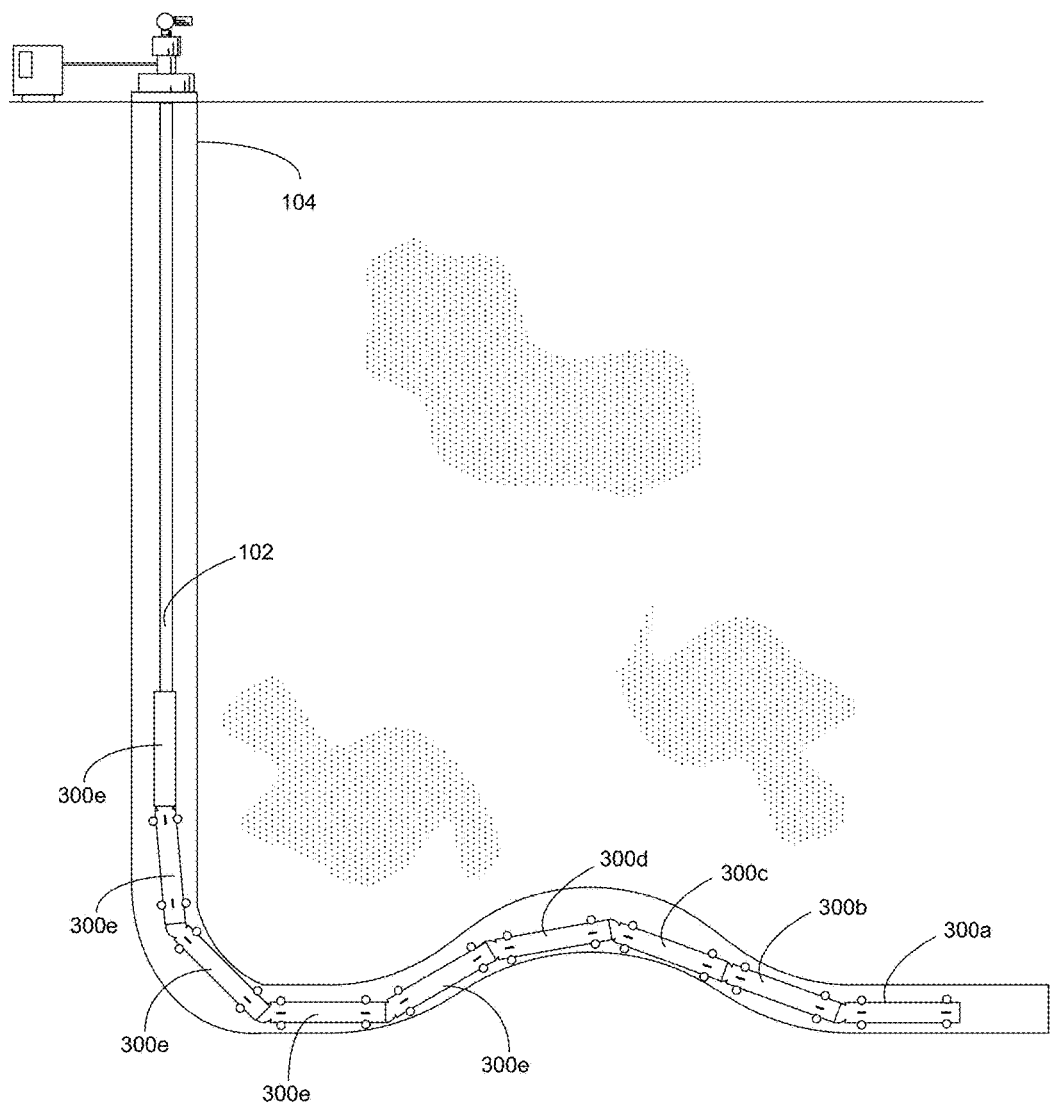
FIG. 22 is a side elevational view of a pumping system constructed in accordance with an alternate embodiment that includes a series of interconnected articulating components.

FIG. 22 is a side view of a pumping system 100 constructed in accordance with an alternate embodiment that includes the use of multiple articulating components 300 disposed in the non-vertical portion of the wellbore 104. As illustrated in FIG. 22, the pumping system 100 includes a sensor package 300a, a motor 300b, a seal section 300c, a pump assembly 300d and a plurality of articulating conduits 300e. Each of these articulating components 300 includes a ball-and-socket mechanism that provides a degree of angular articulation between adjacent components. In an exemplary embodiment, each of the articulating components 300 also includes casters 316, bearings 326 or roller balls 330 to facilitate the movement of the articulating components 300 along the wellbore 104. The use of the articulating components 300 permits the deployment and operation of the pumping system 100 into undulated, horizontal portions of the wellbore 104.

Thus, in the embodiment depicted in FIG. 22, the pumping system 100 includes a number of interconnected articulating components 300 that collectively provide flexible train that can be extended into non-vertical wellbores. It will be appreciated that certain of the articulating components 300 may not include the ball 304 and socket 306. For example, at the distal end of the pumping system 100, the sensor package 300a may not include a socket 306 because it is not connected to any upstream components. As an additional example, in certain applications it may be desirable to rigidly fix the motor 300b to the pump 300d to prevent counter-rotation of these devices in response to the application of torque from the motor 300b. The last link of the articulating conduit 300e may not include a ball 304 because it includes a rigid connection to the production tubing 102 in the vertical portion of the wellbore 104.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An adapter for use in connecting a first component within a downhole pumping system to a second component within the downhole pumping system, wherein the adapter comprises:
   an upstream section adjacent the first component;
   a downstream section adjacent the second component;
   an articulating joint, wherein the articulating joint permits the angular movement of the first component with respect to the second component and wherein the articulating joint comprises a flexible metal casing extending between the upstream section and the downstream section;
   an upstream shaft;
   a downstream shaft;
   a shaft coupling that permits an angular articulation between the upstream shaft and downstream shaft; and
   a fluid passage, wherein the fluid passage is disposed between the upstream shaft and the upstream section, the downstream shaft and the downstream section, and the shaft coupling and the articulating joint.

2. The adapter of claim 1, wherein the flexible metal casing includes a ribbed external surface that includes one or more circumferentially oriented grooves.

3. The adapter of claim 1, wherein the upstream shaft is integral with a shaft extending through the first component.

4. The adapter of claim 3, wherein at least one of the upstream shaft and the downstream shaft includes an end with a series of convex curved splines.

5. The adapter of claim 3, wherein the shaft coupling is selected from the group consisting of universal joints; constant velocity joints, and flex receivers.

6. The adapter of claim 1, wherein the shaft coupling comprises:
   an upstream receiver configured to receive an end of the upstream shaft; and
   a downstream receiver configured to receive an end of the downstream shaft.

7. The adapter of claim 6, wherein at least one of the upstream receiver and the downstream receiver includes a series of convex curved splines.

8. A submersible pumping system comprising:
   an upstream component;
   a downstream component; and
   a flexible adapter connected between the upstream component and the downstream component, wherein the flexible adapter comprises:
      an upstream section adjacent the upstream component;
      a downstream section adjacent the downstream component;
      an upstream shaft
      a downstream shaft
      a shaft coupling that permits an angular articulation between the upstream shaft and downstream shaft
      an articulating joint, wherein the articulating joint permits the angular movement of the first component with respect to the second component and wherein the articulating joint comprises a flexible metal casing extending between the upstream section and the downstream section; and
      a fluid passage, wherein the fluid passage is disposed between the upstream shaft and the upstream section, the downstream shaft and the downstream section, and the shaft coupling and the articulating joint.

9. The submersible pumping system of claim 8, wherein the flexible metal casing includes a ribbed external surface that includes one or more circumferentially oriented grooves.

10. The submersible pumping system of claim 8, wherein the upstream shaft is integral with a shaft extending through the first component.

11. The submersible pumping system of claim 8, wherein the shaft coupling comprises:
    an upstream receiver configured to receive an end of the upstream shaft; and
    a downstream receiver configured to receive an end of the downstream shaft.

12. A submersible pumping system comprising:
    an upstream component;
    a downstream component; and
    a flexible adapter connected between the upstream component and the downstream component, wherein the flexible adapter comprises:
       an upstream section adjacent to the upstream component
       a downstream section adjacent to the downstream component
       an upstream shaft;
       a downstream shaft;
       an articulating joint, wherein the articulating joint comprises:
          a flexible metal casing extending between the upstream section and the downstream section; and a shaft coupling that permits an angular articulation between the upstream shaft and downstream shaft; and a fluid passage, wherein the fluid passage is disposed between the upstream shaft and the upstream section, the downstream shaft and the downstream section, and the shaft coupling and the flexible metal casing.

13. The submersible pumping system of claim 12, wherein the upstream shaft is integral with a shaft extending through the first component.

14. The submersible pumping system of claim 12, wherein the shaft coupling comprises:

an upstream receiver configured to receive an end of the upstream shaft; and a downstream receiver configured to receive an end of the downstream shaft.

* * * * *